(12) United States Patent
Kuo (10) Patent No.: US 6,840,656 B2
(45) Date of Patent: Jan. 11, 2005

(54) LIGHT GUIDING PLATE FOR BACKLIGHT MODULE

(76) Inventor: Heng Sheng Kuo, P.O. Box. 26-757, Taipei (TW), 106

(*) Notice: Subject to any disclaimer, the term of this patent is extended or adjusted under 35 U.S.C. 154(b) by 0 days.

(21) Appl. No.: 10/377,420

(22) Filed: Feb. 27, 2003

(65) Prior Publication Data
US 2004/0170021 A1 Sep. 2, 2004

(51) Int. Cl.⁷ ............................................. F21V 5/00
(52) U.S. Cl. .................. 362/330; 362/31; 362/328; 40/546
(58) Field of Search ........................... 362/328, 27, 31, 362/216, 217, 326, 330; 40/546

(56) References Cited

U.S. PATENT DOCUMENTS

| | | | | |
|---|---|---|---|---|
| 4,660,936 A | * | 4/1987 | Nosker | 349/67 |
| 5,143,433 A | * | 9/1992 | Farrell | 362/29 |
| 5,357,405 A | * | 10/1994 | Park | 362/31 |
| 5,479,275 A | * | 12/1995 | Abileah | 349/5 |
| 5,479,328 A | * | 12/1995 | Lee et al. | 362/216 |
| 5,986,728 A | * | 11/1999 | Bernard | 349/68 |

* cited by examiner

Primary Examiner—John Anthony Ward
(74) Attorney, Agent, or Firm—Apex Juris, pllc; Tracy M Helms (57) ABSTRACT

A light guiding plate according to the invention is mounted in a vertical backlight module between an illumination element and a diffusion plate. The light guiding plate has a flat light incidence surface at a bottom of the light guiding plate and a light emergence surface at a top of the light guiding plate. The light incidence surface faces the illumination element. The light emergence surface is adjacent to the diffusion plate and has a concave portion right above the illumination element. The concave portion of the light guiding plate further diffuses the light transmitted right above the illumination element to homogenize the light emergence and increase the glow for display of the backlight module. The total thickness of the vertical backlight module thereby is reduced to minimize the volume of the backlight module.

8 Claims, 8 Drawing Sheets

LIGHT GUIDING PLATE FOR BACKLIGHT MODULE

BACKGROUND OF THE INVENTION

1. Field of the Invention

The invention relates to a light guiding plate. More particularly, the invention provides a light guiding plate used in a vertical backlight module of a liquid crystal display, a scanner or an advertisement panel.

2. Description of the Related Art

Display devices play an important role in communicating information through images. A CRT-type display device uses an electron beam to display images on a curved or flat panel. A picture tube of the CRT-type display device occupies a substantially large space to provide the necessary electron beam. A principal disadvantage of the CRT display therefore is the space occupied thereby.

Recently, a compact display device such as a liquid crystal flat display has been developed and put into production. It has become popular due to its low weight and space saving advantages. Laptop computers are consequently made increasingly thinner and more compact by employment of liquid crystal displays, to facilitate transportation thereof. Increasingly, desktop computers are also equipped with liquid crystal display devices since the price of the liquid crystal display devices has dropped. Space reduction of the display device brings the user a comfort of use and allows him/her to fully utilize the working space.

Figure 1:
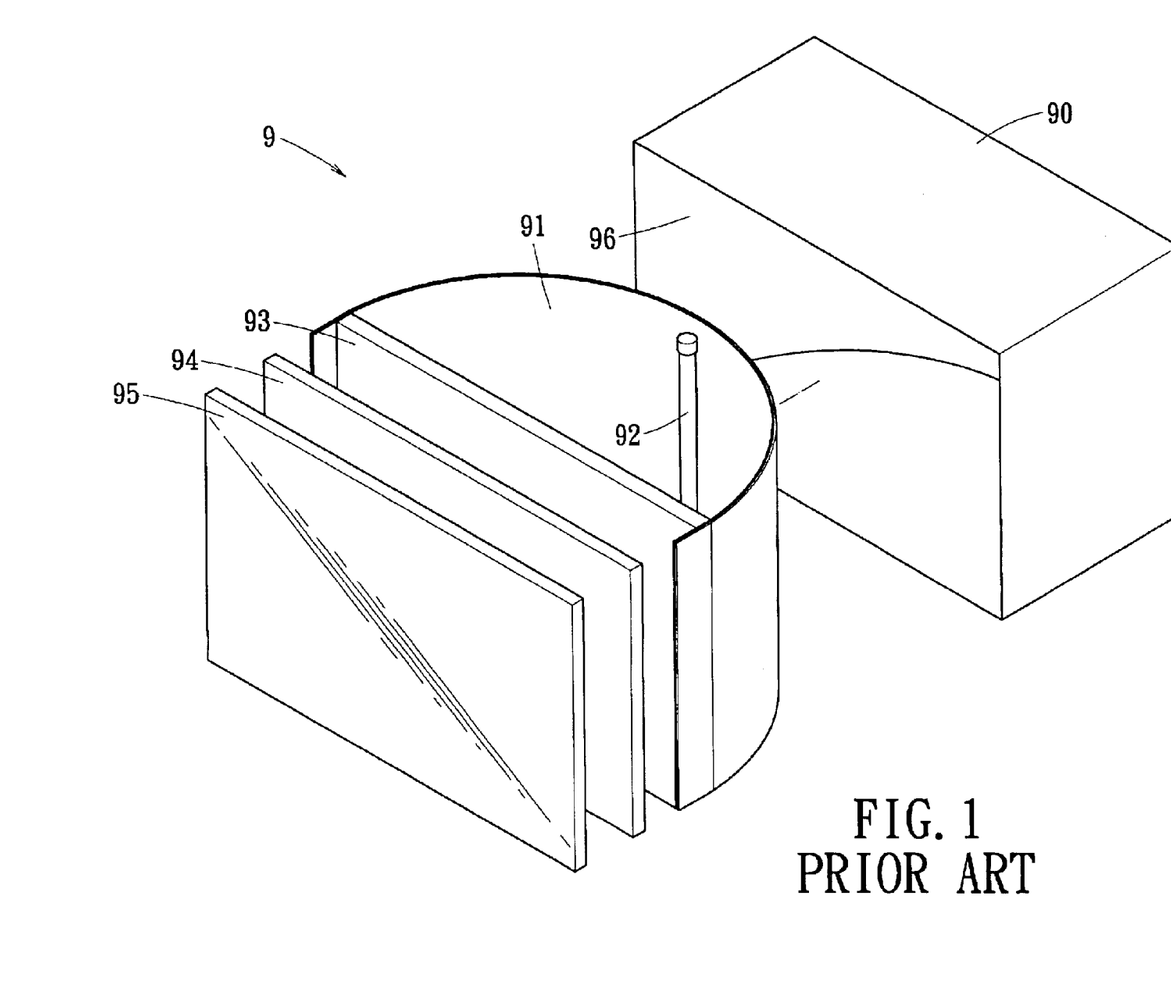
FIG. 1 is an exploded view of a conventional vertical backlight module.

The optical module assembled with a light guiding plate realizes the flattening of the display device. Referring to FIG. 1, a conventional vertical backlight module 9 includes a base 90, a reflector 91, an illumination element 92, a light guiding plate 93, a diffusion plate 94 and a liquid crystal module 95. The base 90 is a rectangular solid and has a curved inner surface 96 to attach to the arc-like reflector 91. The illumination element 92 is mounted in an approximately central location of the base 90 and above the reflector 91. Opposite sides of the rectangular light guiding plate 93 are respectively fastened to a surface 96 of the base 90. The rectangular diffusion plate 94 is also fastened to the surface 96 and attached on the light guiding plate 93. Then, the liquid crystal module 95 is attached on the diffusion plate 94. Thereby, a conventional vertical backlight module 9 is accomplished.

Figure 2:
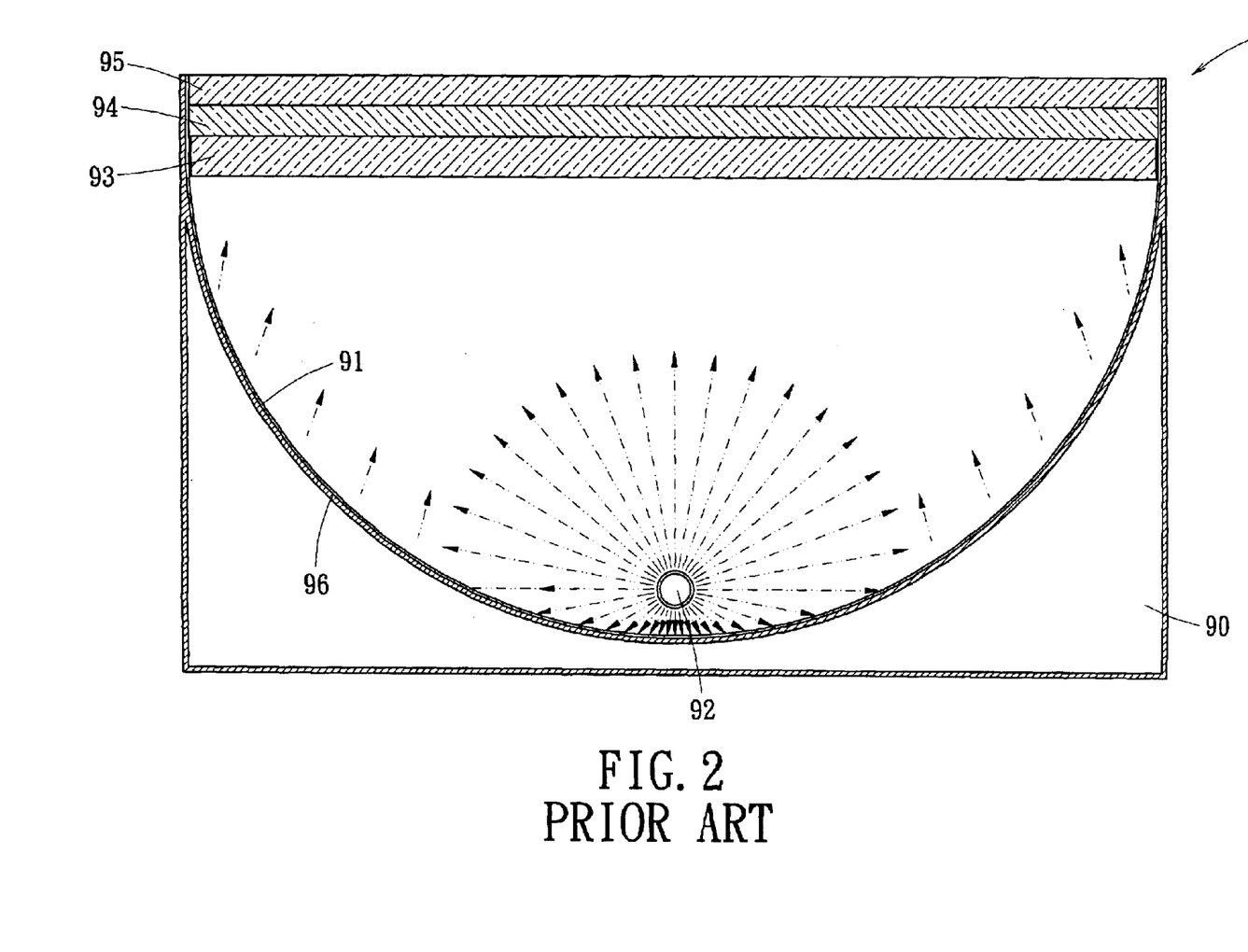
FIG. 2 is a cross-sectional view of a conventional vertical backlight module in use.

In the above structure of the conventional backlight module 9 (as shown in FIG. 2), light irradiated from a lower part of the illumination element 92 and reflected by the reflector 91 is transmitted to the light guiding plate 93. Light irradiated from an upper part of the illumination element 92 is guided directly to the light guiding plate 93 without reflection. In particular, the light irradiated right from the top of the illumination element 92 is transmitted directly to the light guiding plate with the shortest transmission distance. Since the light guiding plate 93 is flat, all the incident light is guided to the diffusion plate 94 at a constant angle. The distribution of the incident light in the diffusion plate 94 is the same as that of emergent light from the light guiding plate 93. Therefore, the light intensity at the area right above the illumination element 92 of the backlight module 9 is substantially higher than that at other areas. This causes an uneven light emergence on the whole display of the backlight module 9. As a result, the glow of the vertical backlight module 9 is adversely affected.

SUMMARY OF THE INVENTION

It is therefore a principal object of the invention to provide a light guiding plate by which the light emergence is homogenized for display of the backlight module.

It is another object of the invention to provide a light guiding plate by which the total thickness of the vertical backlight module is reduced to minimize the volume of the backlight module.

To accomplish the above and other objectives, the invention provides a light guiding plate that is mounted in a vertical backlight module between an illumination element and a diffusion plate. The light guiding plate has a flat light incidence surface at a bottom of the light guiding plate and a light emergence surface at a top of the light guiding plate. The light incidence surface faces the illumination element. The light emergence surface is adjacent to the diffusion plate and has a concave portion right above the illumination element. The concave portion of the light guiding plate further diffuses the light transmitted right above the illumination element to homogenize the light emergence and increase the glow for display of the backlight module. The total thickness of the vertical backlight module can be thus reduced to minimize the volume of the backlight module.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Wherever possible in the following description, like reference numerals will refer to like elements and parts unless otherwise. illustrated.

Figure 3:
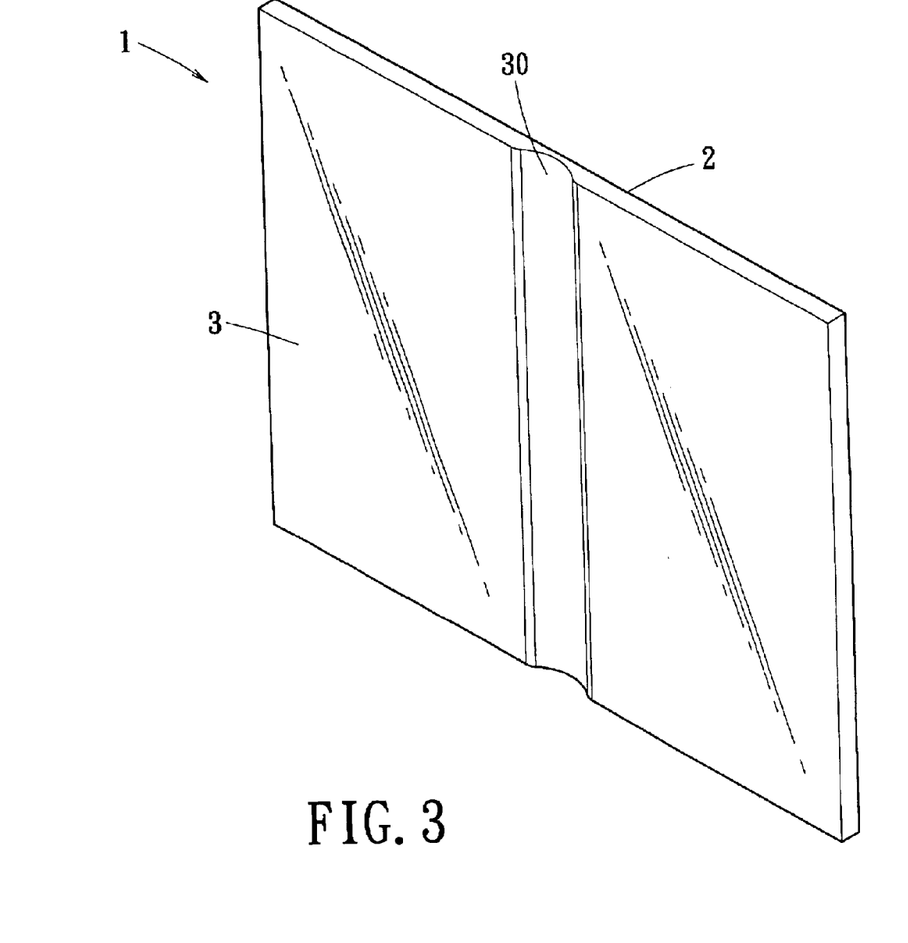
FIG. 3 is a perspective view of a light guiding plate structure according to one embodiment of the invention.
Figure 4:
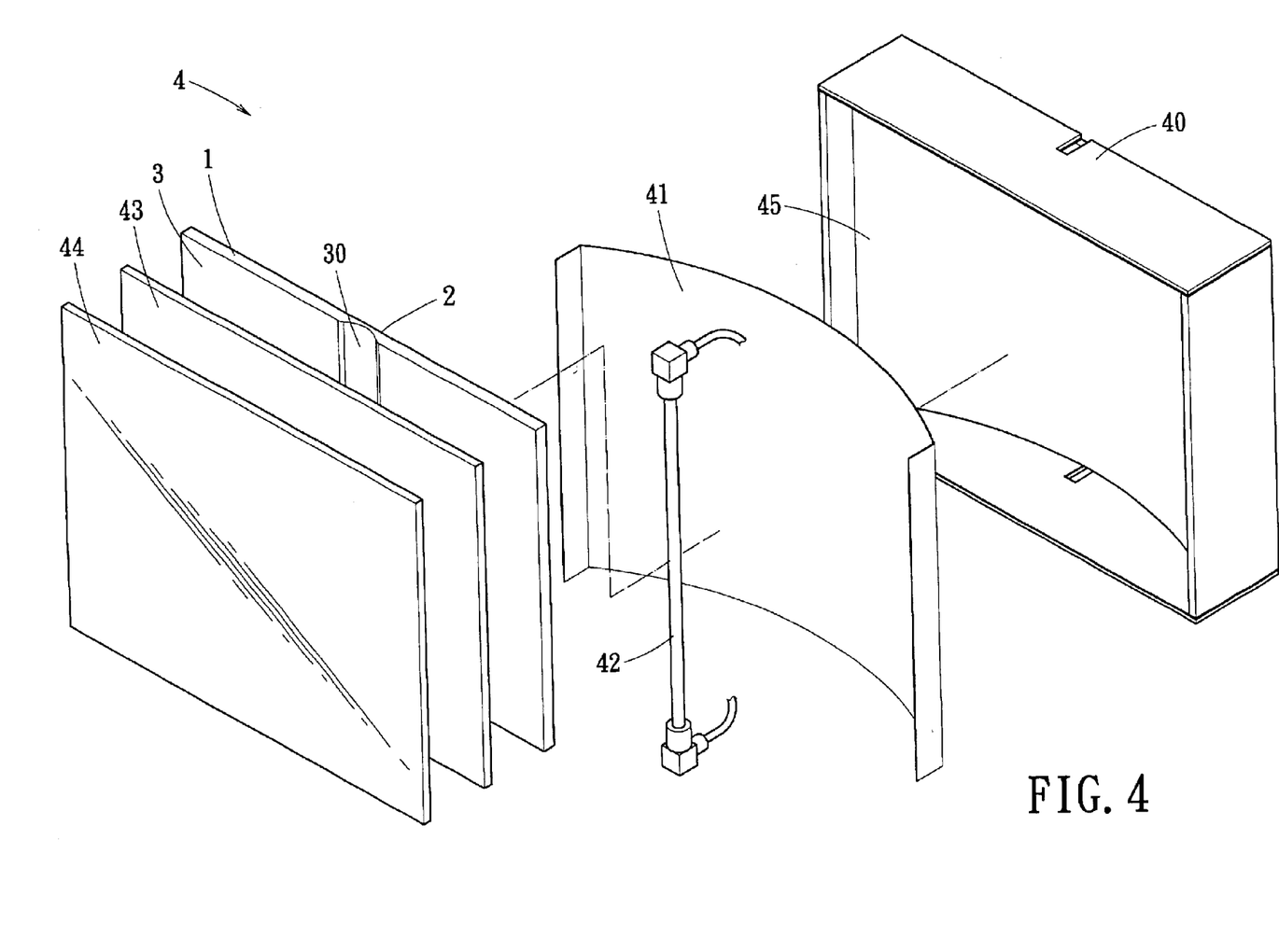
FIG. 4 is an exploded view of a vertical backlight module in which a light guiding plate structure according to one embodiment of the invention is mounted.
Figure 5:
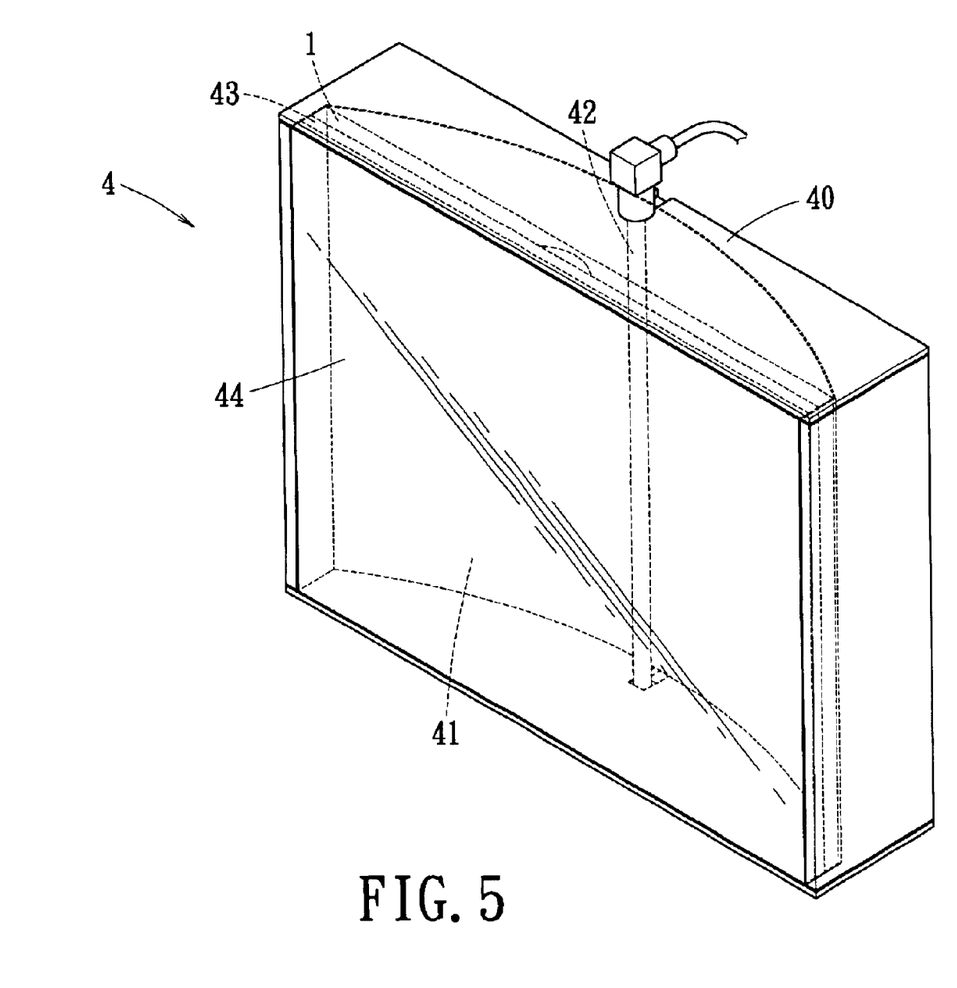
FIG. 5 is a perspective view of a vertical backlight module according to one embodiment of the invention.

Referring to FIG. 3, the invention provides. a light guiding plate 1 that is flat and made of transparent material. At a bottom of the light guiding plate 1 is formed a flat light incidence surface 2. At a top of the light guiding plate 1 is formed a light emergence surface 3 with a concave portion 30. The concave portion 30 consists of segments with various curvatures being smoothly connected to one another.

Referring to FIG. 3 through FIG. 6, the light guiding plate 1 is mounted inside a vertical backlight module 4. The vertical backlight module 4 includes a base 40, a reflector 41, an illumination element 42, a diffusion plate 43, and a liquid crystal module 44. The base 40 is a rectangular solid and has a curved inner surface 45 to attach to the reflector 41. The illumination element 42 is mounted approximately in a central location of the base 40 and above the reflector 41. Then, the light guiding plate 1, the diffusion plate 43 and the liquid crystal module 44 are sequentially mounted in the base 40. The method used to assemble the module 4 and the components of the module 4 are well known in the art and thus their detailed description is omitted herein.

The light guiding plate 1 is mounted between the illumination element 42 and the diffusion plate 43, the light incidence surface 2 facing the illumination element 42 and the light emergence surface 3 being adjacent to the diffusion plate 43. The concave portion 30 has a length not less than the illumination element 42 and located right above a top of the illumination element 42.

Figure 6:
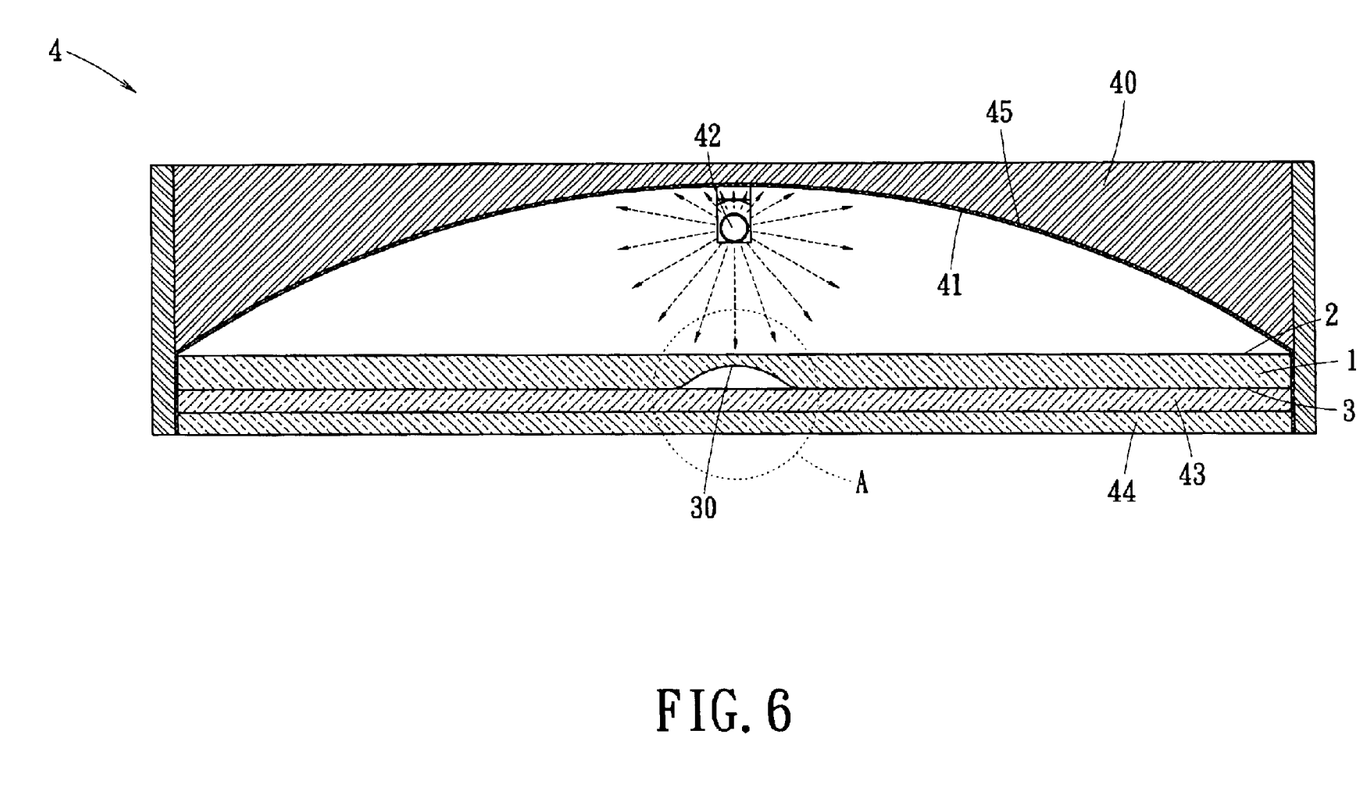
FIG. 6 is a cross-sectional view of a vertical backlight module in use according to one embodiment of the invention.
Figure 7:
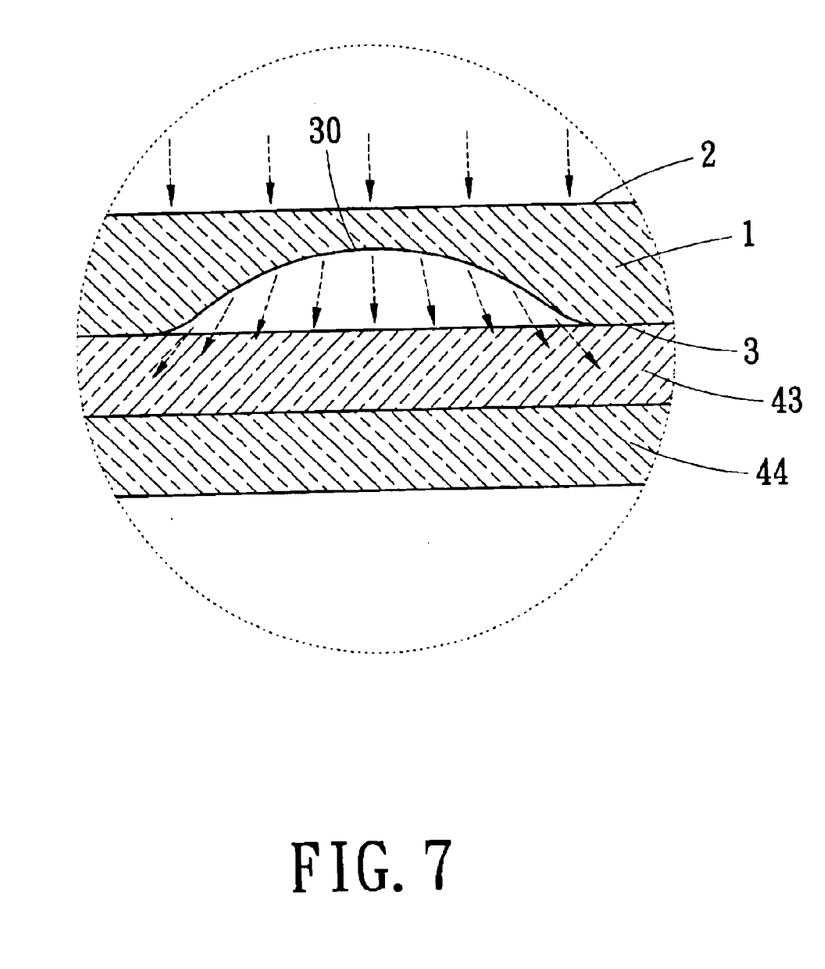
FIG. 7 is an enlarged view of part A of FIG. 6.

FIG. 6 and FIG. 7 are cross-sectional views showing the illumination of the illumination element 42. Light irradiated from the illumination element 42 travels respectively through the light incidence surface 2, the main portion of the light guiding plate 1 and the light emergence surface 3. The light transmitted through the light guiding plate 1 right above the illumination element 42 is outwardly diffused by the concave surface 30 before being transmitted through the light emergence. surface 3. Thereby, the intensity of the light transmitted through the portion of the light guiding plate 1 right above the illumination element 42 is as uniform as through the remaining portions of the light guiding plate 1. The light guiding plate 1 has a uniform light emergence in each portion without any intensively bright area as encountered in the prior art (as shown in FIG. 2). The undesired presence of an intensively bright area right above the illumination element 92 which causes uneven glow and homogeneity at the display panel thereby is prevented. Furthermore, the light incidence surface 2 can optionally be provided with a plurality of strip-shaped patterns (not shown) to further diffuse the light and provide the display of the backlight module with a higher glow and homogeneity.

Figure 8:
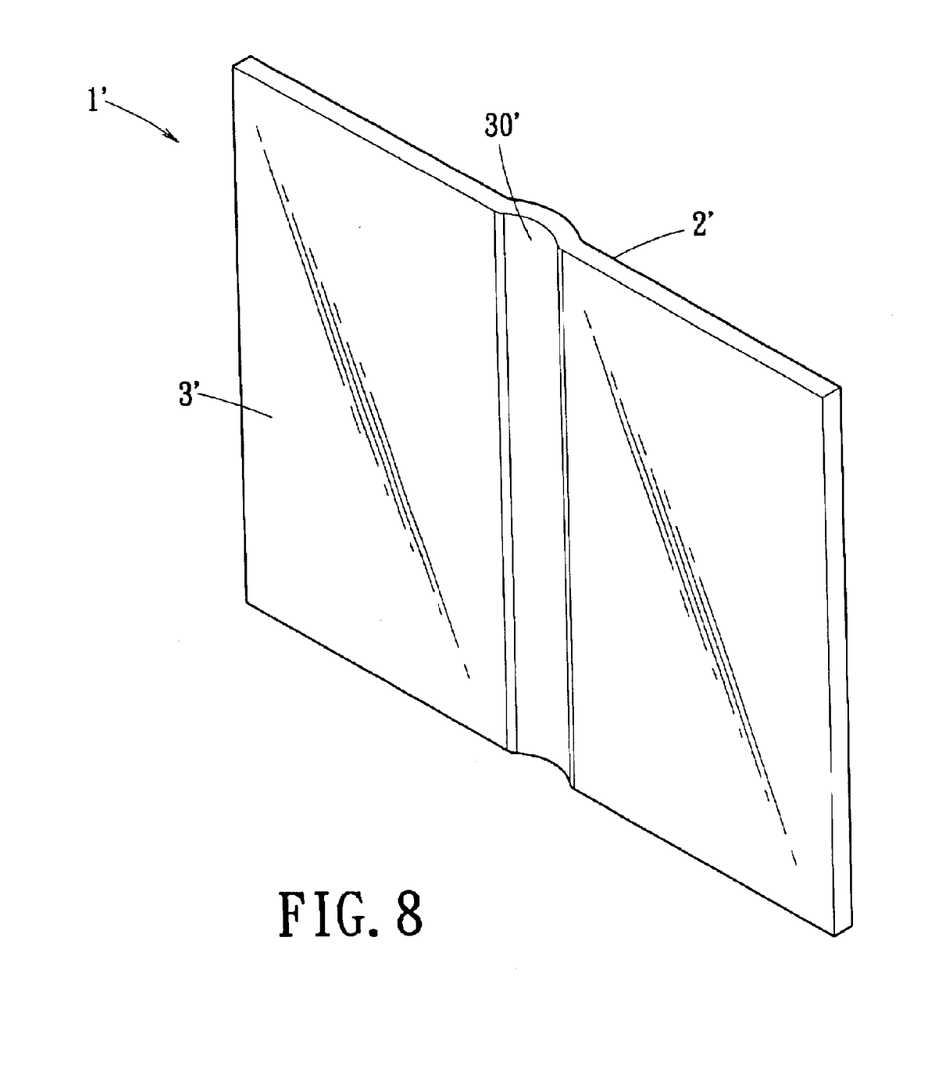
FIG. 8 is a perspective view of a light guiding plate according to another embodiment of the invention.

FIG. 8 is a perspective view of a light guiding plate according to another embodiment of the invention. A light incidence surface 2' of a light guiding plate 1' complies with the profile of a light emergence surface 3' so that the light guiding plate 1' has an even thickness.

As described above, the light guiding plate of the invention has the following advantages. The light transmitted through the light guiding plate right above the illumination element of the backlight module is evenly diffused by the concave portion. Therefore, the backlight module exhibits a higher glow and homogeneity. Furthermore, the total thickness of the vertical backlight module is reduced, which allows a minimization of the volume of the backlight module.

Those skilled in the art will readily appreciate that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A light guiding plate, mounted in a vertical backlight module and between an illumination element and a diffusion plate arranged on the vertical backlight module, the light guiding plate comprising a flat light incidence surface at a bottom thereof and a light emergence surface at a top thereof, wherein the light incidence surface faces the illumination element, wherein the light emergence surface has a flat portion for abutting the diffusion plate and a concave portion positioned on a middle of the flat portion for aligning the illumination element, and the concave portion having a curved surface to diffuse light transmitted right above the illumination element, homogenize the light emergence and increase a glow for display of the backlight module.

2. The light guiding plate of claim 1, wherein the light guiding plate is made of a transparent material.

3. The light guiding plate of claim 1, wherein the light incidence surface is a flat surface.

4. The light guiding plate of claim 1, wherein the light incidence surface is further provided with a plurality of strip-shaped patterns.

5. The light guiding plate of claim 1, wherein the concave portion of the light emergence surface consists of segments with various curvatures being smoothly connected to one another.

6. The light guiding plate of claim 1, wherein the concave portion of the light emergence surface is as large as the illumination element.

7. The light guiding plate of claim 1, wherein the concave portion of the light emergence surface is larger than the illumination element.

8. The light guiding plate of claim 1, wherein the light incidence surface complies with a profile of the light emergence surface.

* * * * *